H. K. FORBIS.
Mortising-Tools.

No. 146,058.             Patented Dec. 30, 1873.

WITNESSES:

INVENTOR:
H. K. Forbis
BY
ATTORNEYS.

UNITED STATES PATENT OFFICE.

HARBERT K. FORBIS, OF DANVILLE, KENTUCKY, ASSIGNOR TO HIMSELF AND JOHN W. PROCTOR, OF SAME PLACE.

IMPROVEMENT IN MORTISING-TOOLS.

Specification forming part of Letters Patent No. 146,058, dated December 30, 1873; application filed November 15, 1873.

*To all whom it may concern:*

Be it known that I, HARBERT K. FORBIS, of Danville, in the county of Boyle and State of Kentucky, have invented a new and Improved Mortising-Tool, of which the following is a specification:

The object of my invention is to provide an efficient tool for making mortises by boring into the wood, and at the same time cutting it out laterally by moving forward and backward along the wood the length of the mortise; and it consists of a cylindrical piece of steel having cutting-edges along the sides formed by, say, two grooves extending from the cutting end along each side to the shank and vanishing in the surface thereat, and also having cutting-bits formed on the end by a deep notch made between said bits, which project on each side of the notch, the latter to bore into the wood while the former work out the mortise laterally.

Figure 1:
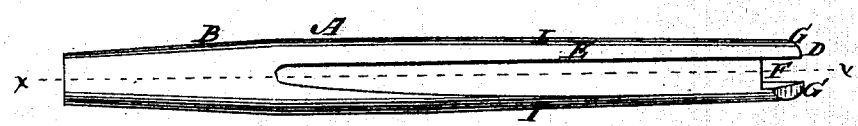
Figure 2:
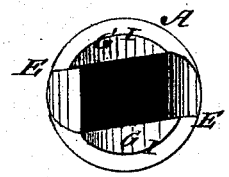
Figure 3:
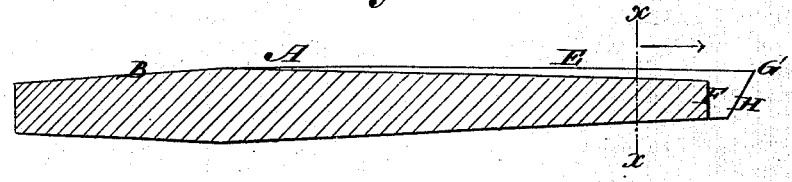
Figure 4:

Figure 1 is a side elevation of a mortising-tool constructed according to my invention. Fig. 2 is an elevation of the cutting-end, and Fig. 3 is a sectional elevation of the tool taken on the line $x$ $x$ of Fig. 1. Fig. 4 is a cross-section on the line $x$ $x$ of Fig. 3.

Similar letters of reference indicate corresponding parts.

A represents a cylindrical piece of steel as large in diameter as the width of the mortise to be made, having a tapered shank, B, to fit in the chuck or stock for holding it; also, having, say, two grooves on opposite sides extending from the cutting-end D to the shank, and tapering so as to vanish thereat, said grooves being so formed that the edge E constitutes a cutter along the side of the tool. At the end D there is a deep notch, F, in the middle portion forming the boring-bits G in prolongation of the side cutters E. Said bits are beveled at H, Fig. 3, for clearance. Back of the cutting-edges E the sides of the tool are dressed off for clearance, when the tool is moving along the wood to work out the mortise. This oval or eccentric shape extends from the round shank B to the boring-point, gradually increasing thereto. The grooves produce air-currents for carrying off the chips, besides affording the space therefor.

Having thus described my invention, I claim as new and desire to secure by Letters Patent—

As an article of manufacture, the tool A, having opposite rabbets, notch F, boring-bits G G', and side cutters E H, the whole constructed substantially as and for the purpose described.

HARBERT K. FORBIS.

Witnesses:
J. M. WALLACE,
N. SANDIFER.